US012195903B2

(12) United States Patent
Burgess et al.

(10) Patent No.: US 12,195,903 B2
(45) Date of Patent: Jan. 14, 2025

(54) DOUBLE IMAGE OVERPRINT CARPET COMPONENTS AND METHODS OF MAKING SAME

(71) Applicant: Aladdin Manufacturing Corporation, Calhoun, GA (US)

(72) Inventors: Clyde Ray Burgess, Dalton, GA (US); Paul Matthew Dabrowa, Rocky Face, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 17/234,234

(22) Filed: Apr. 19, 2021

(65) Prior Publication Data

US 2021/0238785 A1 Aug. 5, 2021

Related U.S. Application Data

(63) Continuation of application No. 15/088,835, filed on Apr. 1, 2016, now abandoned, which is a continuation (Continued)

(51) Int. Cl.
*A47G 27/00* (2006.01)
*A47G 27/02* (2006.01)

(Continued)

(52) U.S. Cl.
CPC ........... *D05C 17/026* (2013.01); *A47G 27/02* (2013.01); *A47G 27/0243* (2013.01);

(Continued)

(58) Field of Classification Search
CPC ...... D05C 15/04; D05C 17/026; D06C 23/00; B44F 5/00; A47G 27/02; A47G 27/0243;

(Continued)

(56) References Cited

U.S. PATENT DOCUMENTS 3,669,818 A 6/1972 Stark
3,850,783 A 11/1974 Peters et al.

(Continued)

FOREIGN PATENT DOCUMENTS

AU 1967029048 A 5/1969
DE 19610120 A1 9/1997

(Continued)

OTHER PUBLICATIONS

U.S. Appl. No. 15/088,835, filed Apr. 1, 2016, 2016-0215426, Published.

(Continued)

*Primary Examiner* — Cheryl Juska
(74) *Attorney, Agent, or Firm* — Meunier Carlin & Curfman LLC

(57) ABSTRACT

Various embodiments of the present invention are directed to carpet components and methods of making the carpet components. In one embodiment, a carpet component is provided. The carpet component includes a carpet substrate having a texture comprising a pattern, wherein the pattern comprises a plurality of adjoining design elements each defining a design and a boundary and wherein the design elements are arranged so that the design of one design element is not predictable from the design of an adjoining design element; and an overprint disposed onto the carpet substrate wherein the overprint comprises a plurality of adjoining design elements each defining a design and a boundary and wherein the design elements are arranged so that the design of at least one design element is predictable from the design of an adjoining design element.

18 Claims, 6 Drawing Sheets

Related U.S. Application Data of application No. 12/364,419, filed on Feb. 2, 2009, now Pat. No. 9,332,870.

(60) Provisional application No. 61/025,693, filed on Feb. 1, 2008.

(51) Int. Cl.

| | |
|---|---|
| ***B44F 5/00*** | (2006.01) |
| ***D05C 15/04*** | (2006.01) |
| ***D05C 15/26*** | (2006.01) |
| ***D05C 17/02*** | (2006.01) |
| ***D06N 7/00*** | (2006.01) |
| ***D06Q 1/00*** | (2006.01) |

(52) U.S. Cl.

CPC ....... *A47G 27/025* (2013.01); *A47G 27/0275* (2013.01); *B44F 5/00* (2013.01); *D05C 15/04* (2013.01); *D05C 15/26* (2013.01); *D05C 17/02* (2013.01); *D06N 7/0065* (2013.01); *D06Q 1/00* (2013.01); *D06N 2209/0815* (2013.01); *D06N 2209/0823* (2013.01); *D06N 2209/083* (2013.01); *Y10T 428/23936* (2015.04)

(58) Field of Classification Search

CPC ................. A47G 27/0275; D06Q 1/00; D06N 2209/0807; D06N 2209/083; Y10T 428/23929; Y10T 428/23936

See application file for complete search history.

(56) References Cited

U.S. PATENT DOCUMENTS

| | | | |
|---|---|---|---|
| 3,875,716 | A | 4/1975 | Eusemann |
| 4,019,036 | A | 4/1977 | Hiramatsu et al. |
| 4,033,154 | A | 7/1977 | Johnson |
| 4,084,615 | A | 4/1978 | Klein et al. |
| 4,216,735 | A | 8/1980 | McDaniel, Jr. |
| 4,423,676 | A | 1/1984 | Neel |
| 4,443,505 | A | 4/1984 | Ehrenfeld, Jr. |
| 4,545,086 | A | 10/1985 | Varner |
| 4,984,169 | A | 1/1991 | Johnson, Jr. |
| 5,022,891 | A | 6/1991 | McBride |
| 5,035,031 | A | 7/1991 | Elliot |
| 5,131,918 | A | 7/1992 | Kelley |
| 5,133,099 | A | 7/1992 | McBride et al. |
| 5,142,481 | A | 8/1992 | Cox |
| 5,159,043 | A | 10/1992 | Mori et al. |
| 5,179,749 | A | 1/1993 | Magee |
| 5,198,277 | A | 3/1993 | Hamilton et al. |
| 5,324,562 | A | 6/1994 | Mullinax et al. |
| 5,381,592 | A | 1/1995 | Higgins |
| 5,383,415 | A | 1/1995 | Padgett, III |
| 5,457,845 | A | 10/1995 | Higgins et al. |
| 5,549,064 | A | 8/1996 | Padgett, III |
| 5,769,904 | A | 6/1998 | Meerschman et al. |
| 5,830,240 | A | 11/1998 | Lin et al. |
| 6,082,412 | A | 7/2000 | Wildeman |
| 6,105,624 | A | 8/2000 | Wildeman et al. |
| 6,494,925 | B1 | 12/2002 | Child et al. |
| 6,509,979 | B2 | 1/2003 | Magee |
| 6,586,053 | B2 | 7/2003 | Brown et al. |
| 6,634,070 | B2 | 10/2003 | Willauer, Jr. |
| 6,704,610 | B2 | 3/2004 | West et al. |
| 6,752,841 | B2 | 6/2004 | Kang et al. |
| 6,792,329 | B2 | 9/2004 | Adams, Jr. et al. |
| 6,793,309 | B2 | 9/2004 | McCay et al. |
| 6,841,216 | B2 | 1/2005 | Daniel et al. |
| 6,846,076 | B2 | 1/2005 | Li |
| 6,854,146 | B2 | 2/2005 | Stoyles et al. |
| 6,884,493 | B2 | 4/2005 | Magee et al. |
| 6,908,656 | B2 | 6/2005 | Daniel et al. |
| 6,945,007 | B2 | 9/2005 | Kobayashi et al. |
| 6,989,037 | B2 | 1/2006 | Brown et al. |
| 7,070,846 | B2 | 7/2006 | Beistline et al. |
| 7,072,733 | B2 | 7/2006 | Magee et al. |
| 7,083,841 | B2 | 8/2006 | Oakey et al. |
| 7,229,680 | B1 | 6/2007 | Crompton |
| 7,374,808 | B2 | 5/2008 | Sellman, Jr. et al. |
| 7,394,555 | B2 | 7/2008 | Cox et al. |
| 7,600,473 | B2 | 10/2009 | Sheppard, Jr. |
| 7,601,418 | B2 | 10/2009 | Sheppard, Jr. |
| 7,717,051 | B1 | 5/2010 | Hall et al. |
| 7,921,789 | B2 | 4/2011 | Bailey et al. |
| 8,145,345 | B2 | 3/2012 | Magee et al. |
| 8,155,776 | B2 | 4/2012 | Bittner et al. |
| 8,765,225 | B2 | 7/2014 | Weiner |
| 9,332,870 | B1 | 5/2016 | Burgess et al. |
| 9,332,871 | B1 | 5/2016 | Burgess et al. |
| 2002/0103719 | A1 | 8/2002 | Beedy |
| 2002/0172796 | A1 | 11/2002 | Magee et al. |
| 2003/0037508 | A1 | 2/2003 | Kobayashi et al. |
| 2003/0051298 | A1 | 3/2003 | Child et al. |
| 2003/0118774 | A1 | 6/2003 | Tippett et al. |
| 2003/0175475 | A1 | 9/2003 | Higgins et al. |
| 2003/0203116 | A1 | 10/2003 | Brown et al. |
| 2003/0207071 | A1 | 11/2003 | Beistline et al. |
| 2004/0185219 | A1 | 9/2004 | Guess |
| 2004/0253408 | A1 | 12/2004 | Hutchison |
| 2005/0048253 | A1 | 3/2005 | Nord et al. |
| 2005/0056337 | A1 | 3/2005 | Magee et al. |
| 2005/0056339 | A1 | 3/2005 | Beane |
| 2005/0106355 | A1 | 5/2005 | Kohlman et al. |
| 2006/0050115 | A1 | 3/2006 | Bujard et al. |
| 2006/0057328 | A1 | 3/2006 | Pacione et al. |
| 2006/0275578 | A1 | 12/2006 | Jones |
| 2006/0280901 | A1 | 12/2006 | Bailey et al. |
| 2007/0260352 | A1 | 11/2007 | Magee et al. |
| 2008/0294272 | A1 | 11/2008 | Bittner et al. |
| 2009/0081406 | A1 | 3/2009 | Higgins et al. |
| 2012/0185074 | A1 | 7/2012 | Bittner et al. |

FOREIGN PATENT DOCUMENTS

| | | | |
|---|---|---|---|
| EP | 892105 | A1 | 1/1999 |
| GB | 1537727 | A | 1/1979 |
| WO | WO-2001/068965 | A1 | 9/2001 |
| WO | WO-2005/026869 | A2 | 3/2005 |
| WO | WO-2007/028665 | A2 | 3/2007 |
| WO | WO-2007/146118 | A2 | 12/2007 |
| WO | WO-2007/146140 | A2 | 12/2007 |
| WO | WO-2009/149242 | A1 | 12/2009 |
| WO | WO-2010/144902 | A2 | 12/2010 |

OTHER PUBLICATIONS

U.S. Appl. No. 12/364,419, filed Feb. 2, 2009, U.S. Pat. No. 9,332,870, Issued.

U.S. Appl. No. 61/025,693, filed Feb. 1, 2008, Expired.

*Carpet Printing*. Zimmer Austria, "Carpet Printing," J. Zimmer Maschinenbau GmbH Kufstein, Druckerei Aschenbrenner, Kufstein, Oct. 2003, (66 pages).

*CRI: The Carpet Primer*. The Carpet and Rug Institute, (2003), (90 pages), ISBN: 0-89275-084-7.

*DesignTuft Version 3 Manual*. Computer Engineered Solutions, Inc., Apr. 3, 2007, (76 pages).

In the United States District Court for the Northern District of Georgia Atlanta Division, Order, *Aladdin Manufacturing Corporation* vs. *Brumlow Mills, Inc*., Civil Action File No. 4:19-cv-00058-WMR, Mar. 1, 2021, pp. 1-24.

U.S. Air Force Interior Design Standards. Whole Building Design Guide, Jul. 2002, (281 pages). [Retrieved From The Internet Nov. 21, 2019] <https://www.wbdg.org/ffc/af-afcec/design-guides-standards/us-air-force-interior-design-2002>.

United Stated District Court Northern District of Georgia Rome Division, Claim Construction Report and Recommendation, *Aladdin Manufacturing Corporation* vs. *Brumlow Mills, Inc*., Case No. 4:19-cv-00058-WMR, Jun. 25, 2020, pp. 1-35 pages.

United States District Court Northern District of Georgia Rome Division, Special Master Response To Objections To Claim Con-

(56) References Cited

OTHER PUBLICATIONS struction Report and Recommendation, *Aladdin Manufacturing Corporation* vs. *Brumlow Mills, Inc.*, Case No. 4:19-cv-00058-WMR, Feb. 1, 2021, pp. 1-30.
United States Patent and Trademark Office, Office Action for U.S. Appl. No. 13/274,025, dated Jul. 11, 2012, (9 pages), USA.
United States Patent and Trademark Office, Office Action for U.S. Appl. No. 13/274,025, dated Aug. 24, 2015, (9 pages), USA.
United States Patent and Trademark Office, Office Action for U.S. Appl. No. 13/274,025, dated Feb. 8, 2013, (12 pages), USA.
United States Patent and Trademark Office, Office Action for U.S. Appl. No. 13/274,025, dated Jan. 7, 2015, (7 pages), USA.
United States Patent and Trademark Office, Office Action for U.S. Appl. No. 13/274,025, dated Jun. 20, 2014, (13 pages), USA.
United States Patent and Trademark Office, Office Action for U.S. Appl. No. 13/274,025, dated Oct. 22, 2013, (10 pages), USA.
United States Patent and Trademark Office, Office Action for U.S. Appl. No. 12/364,419, dated Dec. 5, 2011, (11 pages), USA.
United States Patent and Trademark Office, Office Action for U.S. Appl. No. 12/364,419, dated Jul. 9, 2012, (7 pages), USA.
United States Patent and Trademark Office, Office Action for U.S. Appl. No. 12/364,419, dated Feb. 12, 2013, (13 pages), USA.
United States Patent and Trademark Office, Office Action for U.S. Appl. No. 12/364,419, dated Oct. 22, 2013, (13 pages), USA.
United States Patent and Trademark Office, Office Action for U.S. Appl. No. 12/364,419, dated Jun. 18, 2014, (14 pages), USA.
United States Patent and Trademark Office, Office Action for U.S. Appl. No. 12/364,419, dated Sep. 10, 2015, (7 pages), USA.

DOUBLE IMAGE OVERPRINT CARPET COMPONENTS AND METHODS OF MAKING SAME

CROSS-REFERENCE TO RELATED APPLICATIONS

This application is a continuation of U.S. patent application Ser. No. 15/088,835, filed Apr. 1, 2016, which is a continuation of U.S. patent application Ser. No. 12/364,419, filed Feb. 2, 2009, which claims the benefit of U.S. Provisional Application No. 61/025,693, filed Feb. 1, 2008, all of which are incorporated by reference herein in their entirety.

BACKGROUND OF THE INVENTION

A common challenge faced by the carpet industry is to minimize the appearance of imperfections at the seams between carpet sections when multiple carpet components are needed to cover a particular area (e.g., multiple breadth and modular carpeting installations). This issue can be compounded when design elements within a single carpet component (e.g., broadloom carpet, a roll of tufted carpet, and the like) are duplicated in adjacent carpet components and/or extend into adjacent carpet components. If those design elements are not perfectly duplicated within each carpet component, the region around the seam can become visually obtrusive and can draw attention to any imperfections, such as mismatched color or misaligned design elements.

One known strategy for minimizing the appearance of imperfections at the seams is to print a pattern onto individual carpet components that provides such visual variety across the installation as a whole that any variations at the transitions between individual adjacent carpet components is less noticeable. This technique uses busy, non-regular color patterns which visually overwhelm the discontinuities at the boundaries. The carpet components typically have a non-repeating design that shares common colors and design elements among adjacent carpet components. Although this strategy can be used, it becomes difficult to maintain the non-repeating nature of the design as the number of carpet components needed for a particular application increases. Moreover, this technique limits a customer's design choices to non-regular patterns. Accordingly, there is a need for improved carpet components and designs thereof, which can minimize the appearance of imperfections between adjacent carpet components while increasing the design options for customers.

BRIEF SUMMARY OF THE INVENTION

Various embodiments of the present invention provide improved carpet components and methods of making carpet components. In one embodiment, a carpet component is provided. The carpet component includes a carpet substrate having a texture comprising a pattern, wherein the pattern comprises a plurality of adjoining design elements each defining a design and a boundary and wherein the design elements are arranged so that the design of one design element is not predictable from the design of an adjoining design element; and an overprint disposed onto the carpet substrate wherein the overprint comprises a plurality of adjoining design elements each defining a design and a boundary and wherein the design elements are arranged so that the design of at least one design element is predictable from the design of an adjoining design element.

In a further embodiment, a floor covering is provided. The floor covering includes a plurality of carpet components positioned in to define abutting portions. Each of the carpet components includes a carpet substrate having a texture comprising a pattern, wherein the pattern comprises a plurality of adjoining design elements each defining a design and a boundary and wherein the design elements are arranged so that the design of one design element is not predictable from the design of an adjoining design element; and an overprint disposed onto the carpet substrate wherein the overprint comprises a plurality of adjoining design elements each defining a design and a boundary and wherein the design elements are arranged so that the design of at least one design element is predictable from the design of an adjoining design element. The overprint of adjacent carpet components are in alignment along at least some of the abutting portions of the carpet components.

In another embodiment, a method for creating a carpet component is provided. The method includes the steps of: creating a pattern having an unpredictable combination of design elements; tufting yarn into a primary backing and creating a carpet substrate having a texture defined by a plurality of repeats of the pattern; and overprinting a design onto the carpet substrate, wherein the design comprises a predictable combination of design elements, and wherein the design and the pattern of the carpet substrate are not registered.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1A-C is a schematic diagram illustrating a method of creating an unpredictable pattern according to an embodiment of the present invention.

DETAILED DESCRIPTION OF THE INVENTION

The present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a", "an", and “the” do not denote a limitation of quantity, but rather denote the presence of “at least one” of the referenced item.

Various embodiments of the present invention provide improved carpet components and methods of making carpet components. The carpet components may include a tufted carpet substrate or print-base that has a traditional texture pattern (e.g., weave, cut pile, “frieze”) or a texture including a randomized pattern (e.g., unpredictable pattern), which may or may not be repeated to cover the entire carpet component. A design or designs are then overprinted on the patterned carpet substrate. The overprinted designs can be any traditional design, which might be more appropriate for broadloom installations, or any “scrambled” designs, which might be more appropriate for modular installations. The overprinted designs may be related or independent of the pattern on the carpet substrate. In various embodiments, the pattern in the carpet substrate is not registered with the overprint disposed thereon.

Random or randomized, as used herein, is to be broadly interpreted to encompass disjointed patterns that may or may not repeat. A random or disjointed pattern is an unpredictable combination of design elements, where the design elements have a design and a boundary such as curves, lines, blocks or other shapes. The unpredictability may take the form of a substantial portion of the boundaries of the design elements are discontinuous. In some embodiments, the pattern includes a plurality of adjoining design elements in which each design element has a design and a boundary. The design elements may be arranged so that the design of one design element is not predictable from the design of adjoining design elements.

Figure 1A:
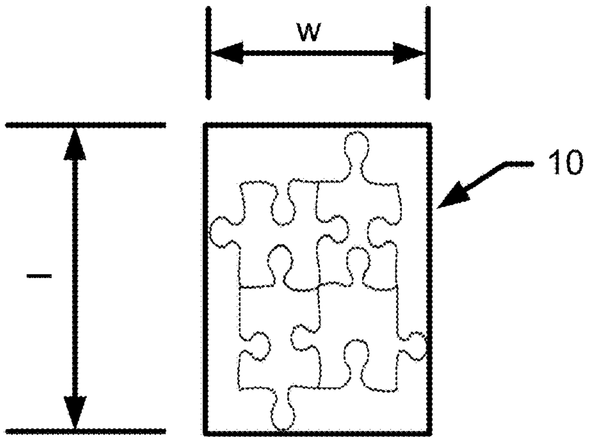
Figure 1B:
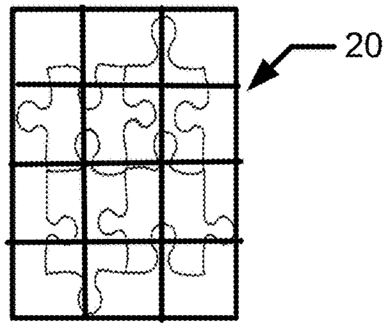
Figure 1C:
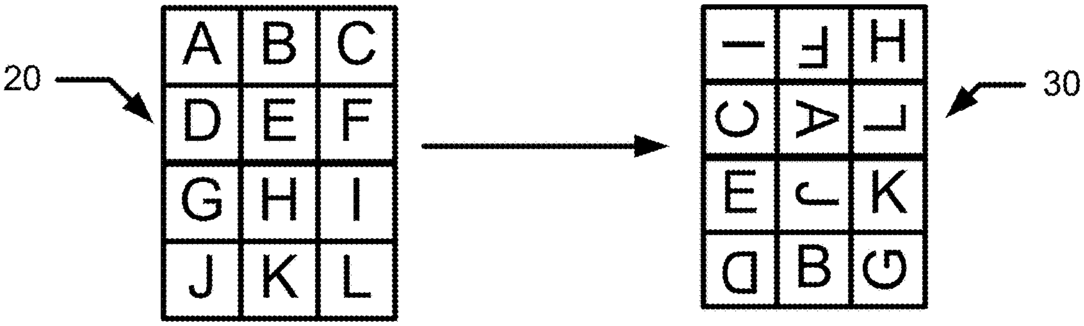

FIGS. 1A-C illustrate a method of creating an unpredictable pattern in accordance with various embodiments of the present invention. The method starts with a pattern 10 that comprises a predictable combination of design elements. The design 10 has a width “w” and a length “l.”

To create an unpredictable design, the design 10 may be divided into a plurality of blocks of substantially uniform size to create the divided design 20 illustrated in FIG. 1B. Some or all of the blocks may then be rearranged to form the unpredictable pattern 30 as illustrated in FIG. 1C. For explanation purposes only, the design elements within each of the blocks of the divided design 20 shown in FIG. 1B have been replaced by associated letters A-L in FIG. 1C to illustrate the rearrangement of the design elements to create the unpredictable pattern 30. Rearranging the blocks may include changing the relative position of the block and/or the relative orientation of the block. As a result of the rearrangement, the design elements defined within the individual blocks are no longer predictable from the design elements of adjoining blocks. Each block in the illustrated embodiment has been used once to form the unpredictable design 30, and the two designs, i.e. the coherent design 10 and the unpredictable design 30, have the same overall size.

Figure 2:
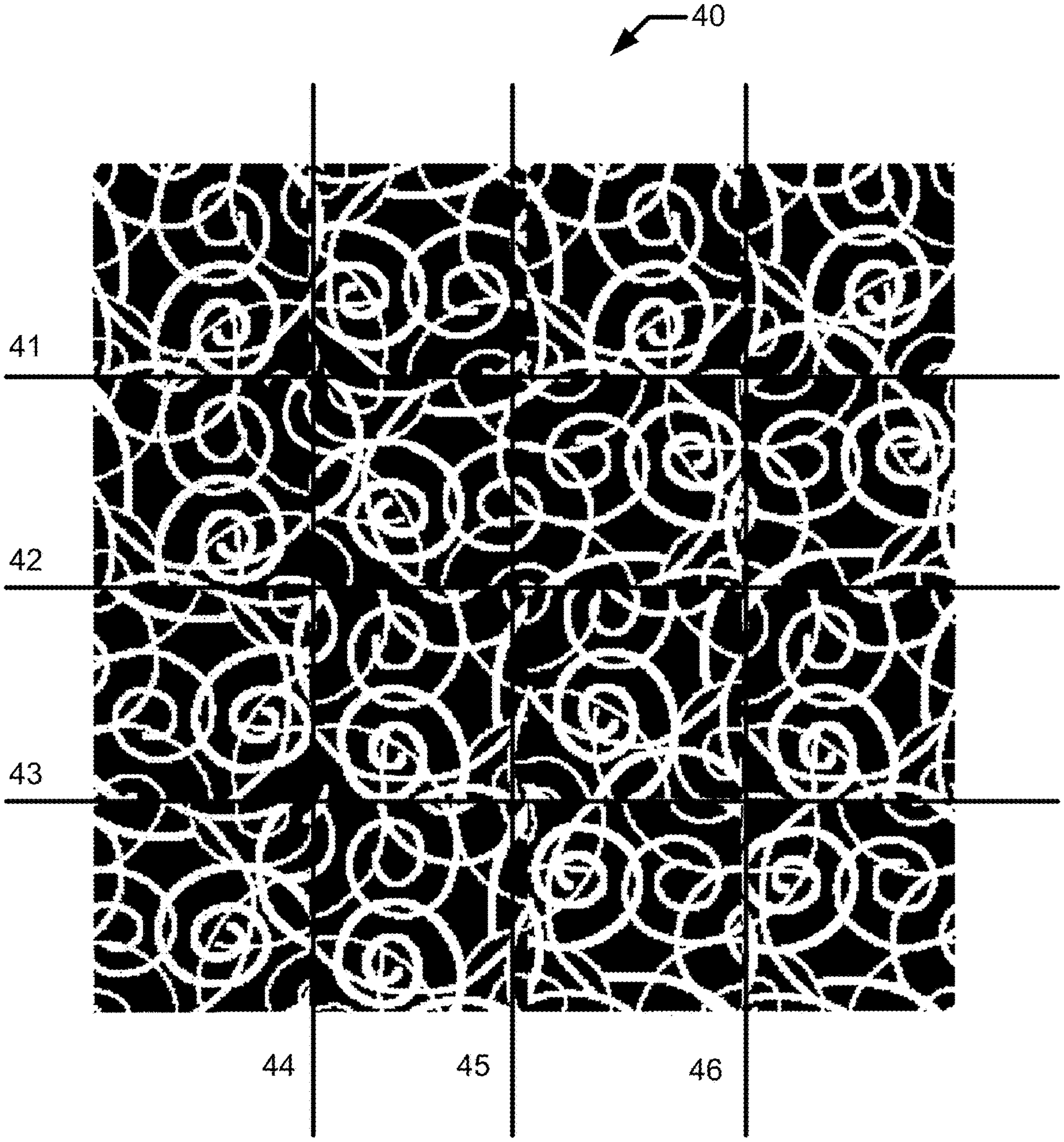
FIGS. 2-5 are unpredictable patterns created using the method illustrated in FIG. 1 in accordance with embodiments of the present invention.
Figure 3:
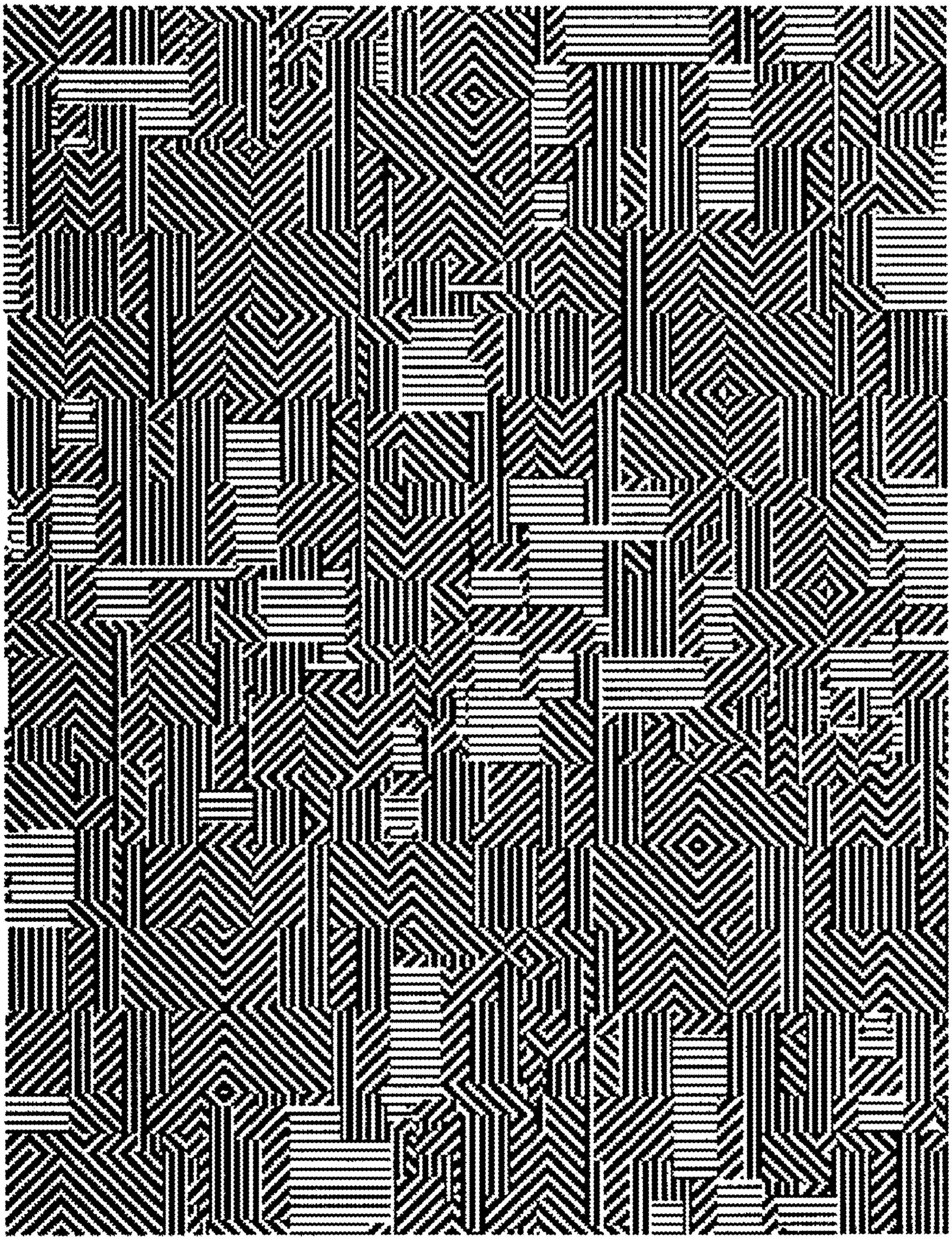
Figure 4:
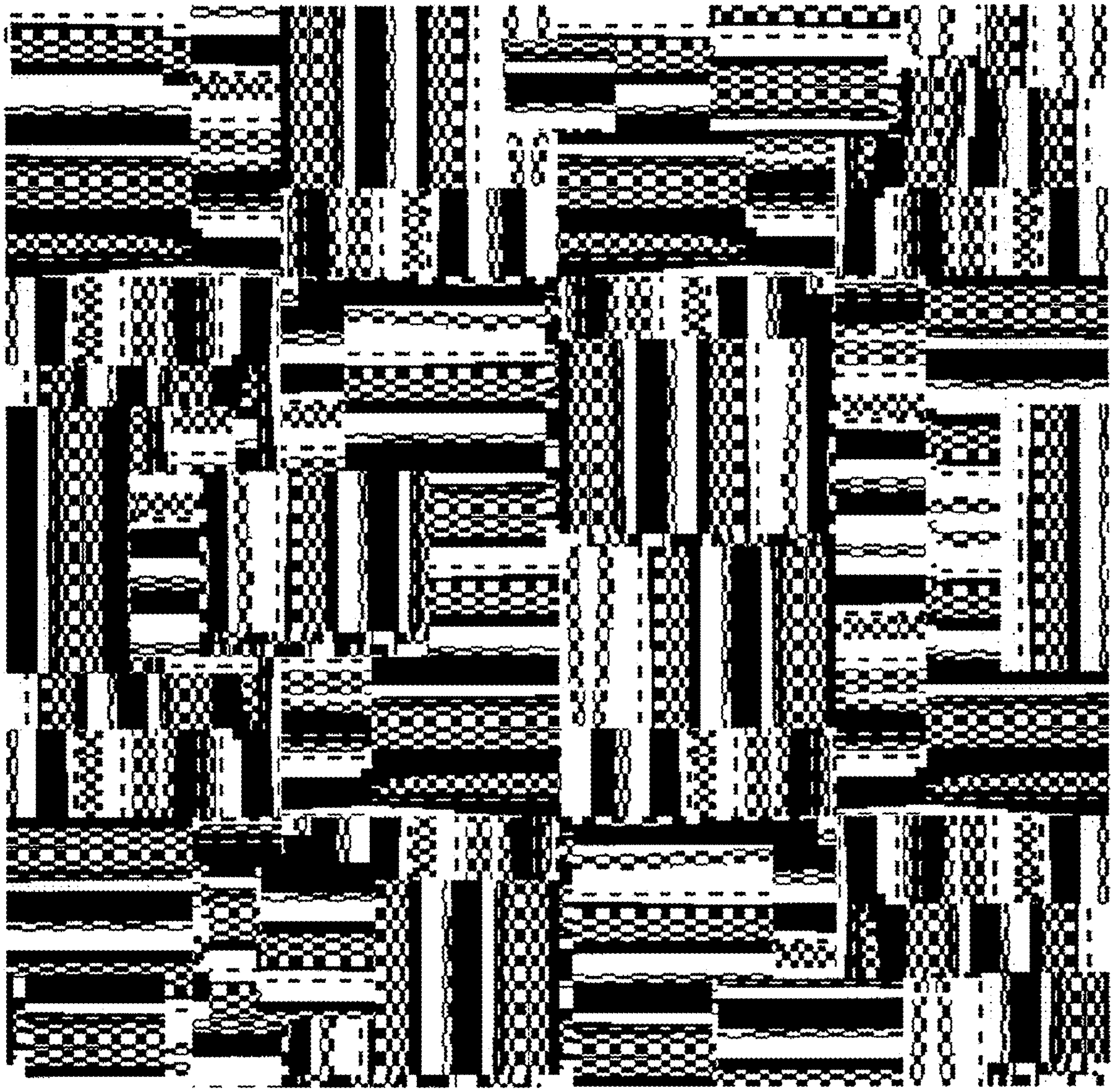
Figure 5:
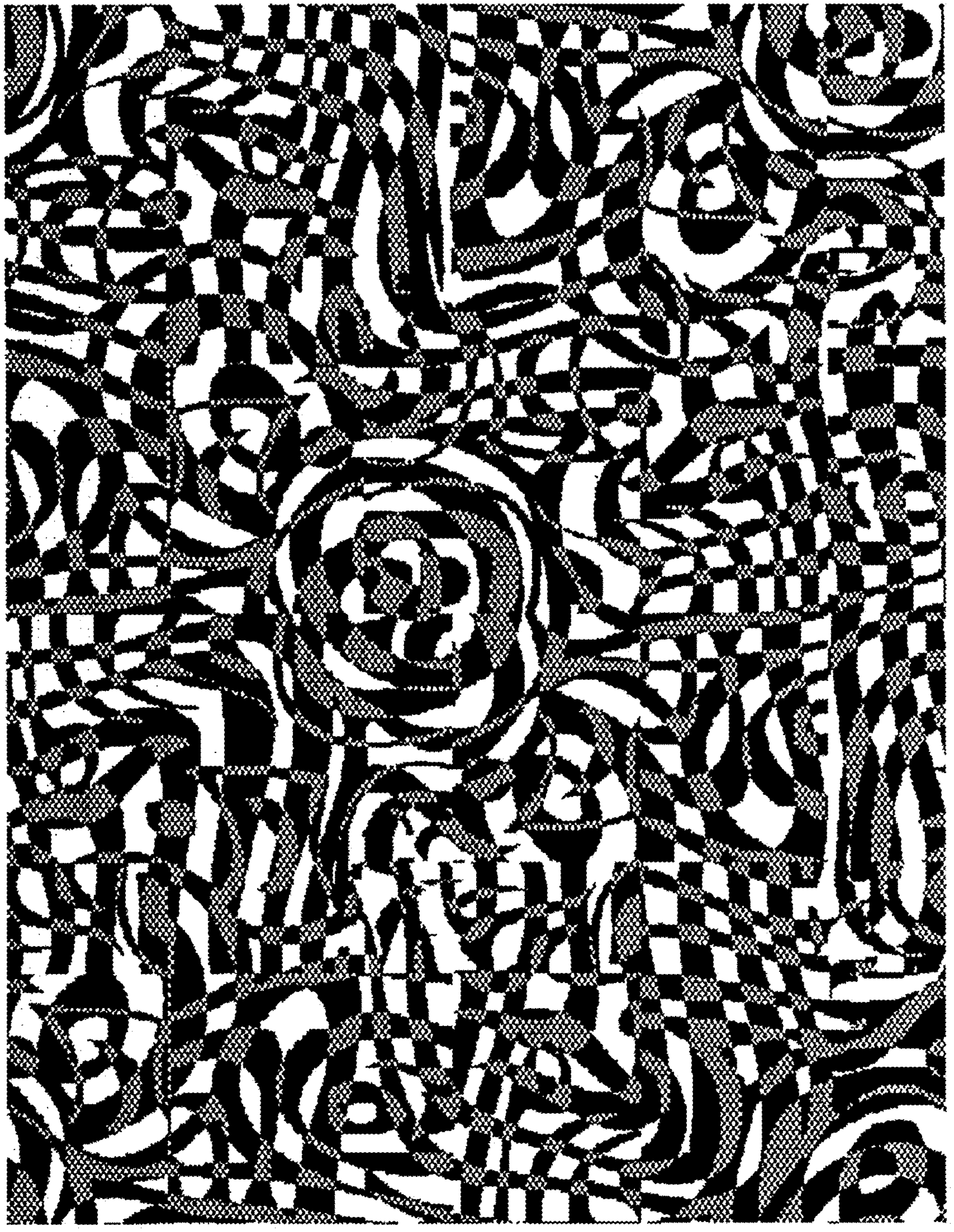

FIG. 2 illustrates an unpredictable pattern 40 created using the foregoing technique. Lines 41-46 have been added to illustrate the boundaries between the individual blocks. As can be seen, the rearrangement of the blocks creates discontinuities in at least some of the design elements at the boundaries of the blocks. Additionally, the rearrangement of the blocks results in the designs of one design element within a particular block not being predictable from the design of adjoining design elements in adjoining blocks. FIGS. 3-5 are further examples of unpredictable patterns created using this technique. In further embodiments, some of the blocks from the original design may be used multiple times or omitted, and the final unpredictable design may have a different overall size than the original. Furthermore, the blocks and/or the pattern may be scaled to produce a larger or smaller overall design.

Although the illustrated designs use rectangular blocks, other shapes such as squares, triangles, pentagons, octagons, or other substantially uniform shapes could be used to create an unpredictable design in conjunction with the present invention. It should be understood that unpredictable or random patterns may be created using any known or developed technique.

The unpredictable patterns shown in FIGS. 2-5 have a length and width and may be repeated to form a texture across the carpet substrate’s width and length. In some embodiments, the width of the carpet substrate is a multiple of the width of the unpredictable pattern.

Embodiments of the present invention will now be described wherein the carpet component includes a texture which is defined at least in part by a pattern. The pattern includes a plurality of adjoining design elements in which each design element has a design and a boundary. The design elements are arranged so that the design of one design element is not predictable from the design of adjoining design elements. The overprint also defines a plurality of adjoining design elements in which each design element has a design and a boundary. However, these design elements are arranged so that the design of one design element is predictable from the design of adjoining design elements. It should be understood, however, that other embodiments may include a predictable pattern on the carpet substrate and an overprinted design that is an unpredictable combination of design elements.

In further embodiments, both the carpet substrate pattern and the overprint design include a plurality of adjoining design elements in which each design element has a design and a boundary. The design elements are arranged so that the design of one design element is not predictable from the design of adjoining design elements. These design elements may or may not be the same between the texture and the overprint in this embodiment.

Carpet Substrate

The carpet substrate may be formed in a conventional manner by stitching a plurality of yarns through a primary backing thereby forming loops. The loops create the wear surface of the carpet substrate. In some embodiment, the loops may be cut to form a pile surface. Tufting machines typically have one or more needle bars with a plurality of needles threaded with individual yarns. The needle bars reciprocate to pass the needles carrying the yarn through a moving primary backing substrate to form loops. Yarn is fed to the needle bars from yarn feed rolls, which are typically controlled by clutches or servomotors. Different tuft heights, whether loop or cut, may be formed by controlling the clutches or servomotors to feed more or less yarn to the needle bars. An example of a textured surface having tufted pattern effects is disclosed in U.S. Pat. Nos. 5,383,415 and 5,549,064, which are incorporated herein by reference. In those patents, the feed of the yarns to the needles of the needle bar is controlled to provide selected high or low tufts in warpwise and weftwise adjacent stitches.

In addition to patterns created by differences in loop or pile height, patterns may also be formed by selectively cutting specific loops while leaving other loops intact (i.e., cut and loop construction). For example, a cut and loop construction can be prepared such that the pile height is identical to the loop height. Thus, the surface of the base layer has a uniform height, but is still textured. Any combination of height-based and non-height-based texture can be used to introduce the pattern in the surface of the carpet substrate.

Returning to FIGS. 2-5, the light and dark sections of the patterns may represent changes in texture to form the pattern. In some embodiments, the light sections may represent a first pile height and the dark sections may represent a second pile height where the two heights are different. In other embodiments, the light sections may represent a cut loop having a first height and the dark sections may represent a non-cut loop having the same height or a different height. It should be understood that any combination of heights or textures may be used to implement the unpredictable pattern.

Generally any fibers or yarns may be used to form the carpet substrates. In some embodiments, the substrate includes acid-dyeable fibers as well as sulfonated cationic dyeable fibers (e.g., polyamide 6, polyamide 6.6, or the like). These fibers may have varying luster levels. The use of these types of fibers allows for multiple color shades to be observed in the overprint design layer. By using two different types of fibers which have varying luster levels or affinities for particular types of dyes, additional patterns may be introduced into the carpet substrate.

Additionally, the density or weight density of the carpet substrate can be varied depending on the application. Once the textured surface has been formed, it can be back-coated or otherwise treated before applying the overprint design.

Overprint Design

As described above, various embodiments of the carpet components generally have a patterned carpet substrate and an overprinted design. The overprint design is disposed on the patterned surface of the carpet substrate to form the carpet component. In various embodiments, the overprint design is not registered with the underlying carpet substrate pattern and has a different pattern repeat size than the carpet substrate pattern. Moreover, the carpet may shift width-wise (i.e. weft-wise) and may stretch length-wise (i.e. warp-wise) as the carpet substrate is overprinted and thus the relationship between the carpet substrate texture and the overprinted design may be continually altered.

The overprint design can be produced using controlled dye injection, screen printing, heat transfer printing, or other processes. In various embodiments, a “ChromoJet” process is used to inject dye into the carpet substrate. ChromoJets generally function by injecting dye into the surface of the carpet substrate. The process is similar to an office ink jet printer. The various jets are arranged in groups, mounted on a print-head, which traverses the carpet substrate. The computer-controlled jets open and close, for example, up to 400 times per second. The color pressure injects dye deep into the surface of the carpet substrate without any machine parts touching the carpet substrate. In embodiments where there is height-based texture in the carpet substrate, the color pressure in the jets may be increased to color the side walls of the higher pile.

Pre-metallized dyes may be used in some embodiments for printing the overprint design layer(s). Using pre-metallized dyes with a combination of sulfonated and non-sulfonated fibers can produce different color shades because the two different types of fiber have different affinities for pre-metallized dyes. This can add a further pattern to the carpet component. Pre-metallized dyes also have the benefit of excellent color fastness properties for the overall carpet components. Still further, the use of sulfonated cationic yarns imparts anionic-based stain resistance to the carpet components. In some embodiments, sulfonated and non-sulfonated yarns are alternated to create a pin-striping effect. Of course, multiple different types of yarn may be use in any arrangement in conjunction with embodiments of the present invention. Moreover, any type of dye may be used as well.

Once the printed design has been added to the patterned surface of the carpet substrate, the carpet component may be steamed and washed in order to affix the color to the fibers and remove any excess dyes and chemicals. Subsequently, the carpet component may be subjected to additional printing steps wherein the additional design components are printed on the first printed patterned layer. Between each successive optional printing step, the carpet component may be steamed and washed so as to prevent bleeding of the colors from various layers of color or between fibers. In some embodiments, the additional design layers are superimposed or overlaid on the first overprint design layer to form a single customized pattern montage. In other embodiments the additional design layers may simply provide additional colors to the first overprint design.

After the final steaming, washing and extraction processes are administered to the printed substrate, the carpet component can be treated with various topical agents to modify the surface properties thereof. For example, the surface of the printed carpet component can be treated with fluorochemicals and/or stainblockers to provide soil and stain blocking capabilities. The specific fluorochemicals/stainblockers and amounts to be applied would be readily determinable by those skilled in the art to which this disclosure pertains. Other compounds can be applied to the surface of the printed carpet component to impart antibacterial, antifungal, and antimicrobial characteristics. Similarly, the specific antibacterial, antifungal, and antimicrobial compositions and amounts to be applied would be readily determinable by those skilled in the art to which this disclosure pertains. The resulting carpet components, depending on particular application, can have a variety of dimensions. Other than machine limitations, there is no limit on the widths of the carpet components. For example, the carpet component can have a width of 6 feet for modular carpeting installations, or about 8 to about 15 feet for multiple breadth installations.

Figure 6:
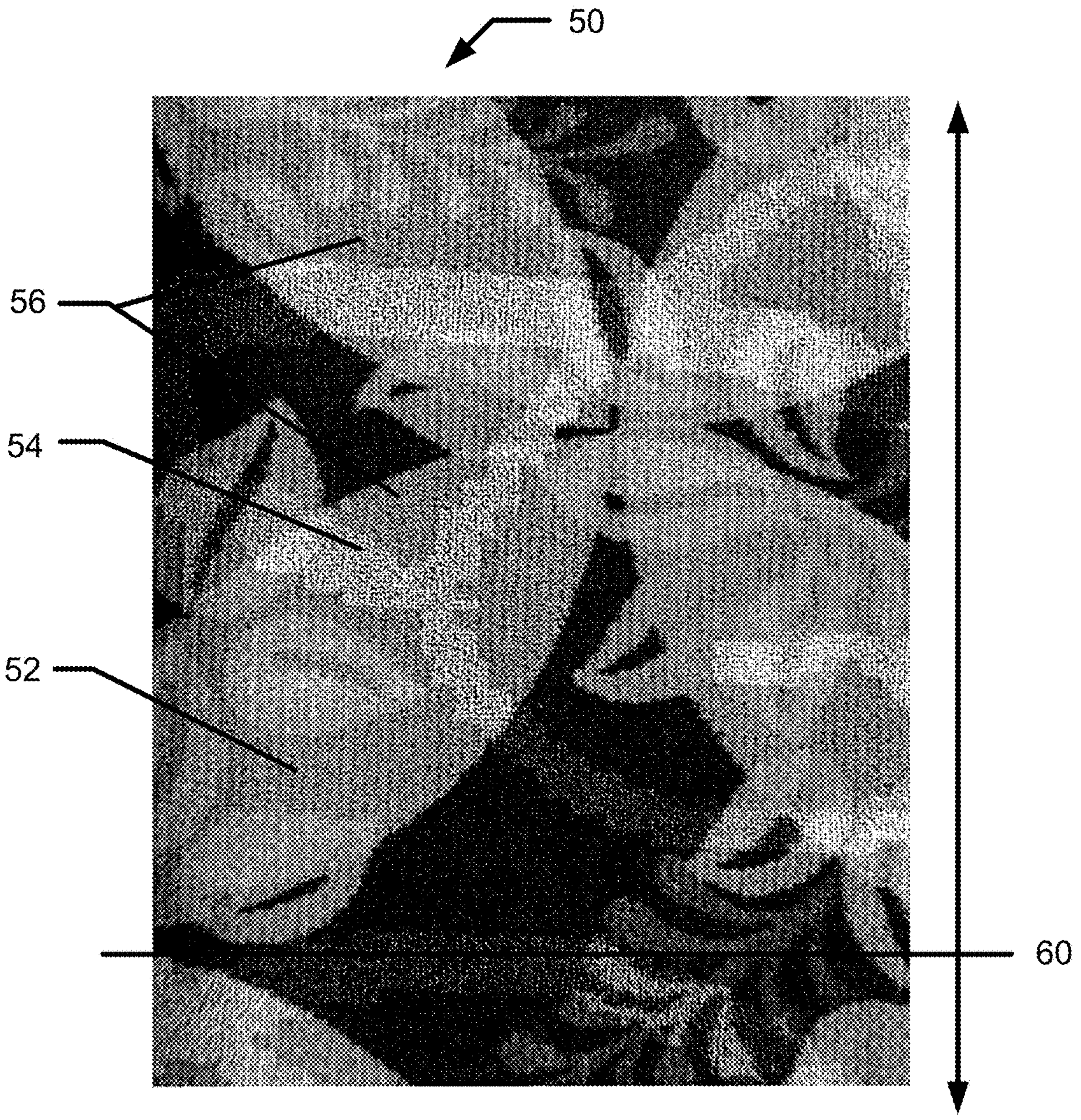
FIG. 6 is pictorial view of a carpet component having a pattern formed in the substrate and an overprint design disposed thereon in accordance with an embodiment of the present invention.

FIG. 6 illustrates a portion of a carpet component 50 that includes a texture defined by a pattern, where the pattern is created using cut and uncut loops as well has height differences. The texture includes an uncut loop portion 54 and a cut loop portion 52. The overprint design includes different types of leaves 56 (e.g., design elements) and is disposed onto the textured carpet substrate. Line 60 illustrates a possible seam location.

Floor Covering

Depending on the application, a floor covering may include a plurality of carpet components in an abutted arrangement to cover a desired area. When abutting the carpet components, an installer will align the coherent overprint design between adjacent carpet components. Alignment, as used to describe the relationship between adjacent carpet components, means aligned within acceptable industry standards and does not require perfect overprint design alignment. Although the unpredictable pattern on the carpet substrate is not aligned, its unpredictable nature may minimize the visual effect of imperfections or variations in the overprint design between adjacent carpet components.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A single carpet component comprising:

a carpet substrate having a texture pattern comprising an unpredictable combination of a plurality of adjacent design elements defined by one or more of (a) different loop height of the carpet substrate, (b) different cut pile height of the carpet substrate, or (c) selective cut and uncut tufts of the carpet substrate, wherein each of the plurality of adjacent design elements has a boundary and wherein at least a first one of the plurality of design elements of the texture pattern shares a boundary with at least one adjacent design element of the texture pattern and wherein the unpredictable combination of the plurality of design elements of the texture pattern intersect at least two opposite edges of the carpet component and are arranged so that a design of the first design element of the texture pattern is not predictable from a design of the at least one adjacent design element of the texture pattern, and wherein the carpet substrate has a plurality of repeats of the texture pattern; and an overprint printed onto the carpet substrate, wherein the overprint comprises a plurality of adjacent design elements, each defining a design and a boundary and wherein at least a first one of the plurality of design elements of the overprint shares a boundary with at least one adjacent design element of the overprint and wherein the design elements of the overprint are arranged so that a design of the first design element of the overprint is predictable from a design of the adjacent design element of the overprint, and wherein the relationship between the texture pattern of the carpet substrate and the overprint is not in a register.

2. The single carpet component of claim 1, wherein the texture pattern comprises a plurality of blocks of substantially the same size and wherein each block defines at least one design element of the texture pattern and the blocks are arranged so that the design elements in one block are not predictable from design elements in adjacent blocks.

3. The single carpet component of claim 1, wherein the texture pattern comprises the pattern repeated in at least one linear direction within the carpet substrate.

4. The single carpet component of claim 3, wherein the overprint design has a repeating design size and the pattern has a repeating pattern size and wherein the repeating design size is different from the repeating pattern size.

5. The single carpet component of claim 3, wherein the overprint has a repeating design size and the texture pattern has a repeating pattern size and wherein the repeating design size is offset relative to the pattern size.

6. The single carpet component of claim 1, wherein the carpet substrate comprises a plurality of different yarn types.

7. The single carpet component of claim 6, wherein the plurality of different yarn types comprises a sulfonated cationic dyeable fiber and a non-sulfonated cationic dyeable fiber.

8. A floor covering comprising:

a plurality of carpet components positioned to define abutting portions, wherein each of the carpet components comprises:

a carpet substrate having a texture pattern comprising an unpredictable combination of a plurality of adjacent design elements defined by one or more of (a) different loop height of the carpet substrate, (b) different cut pile height of the carpet substrate, or (c) selective cut and uncut tufts of the carpet substrate, wherein each of the plurality of adjacent design elements defines a design and a boundary and wherein at least a first one of the plurality of design elements of the texture pattern shares a boundary with at least one adjacent design element of the texture pattern and wherein the unpredictable combination of the plurality of design elements of the texture pattern intersect at least two opposite edges of the carpet component and are arranged so that a design of the first design element of the texture pattern is not predictable from a design of the at least one adjacent design element of the texture pattern, and wherein the carpet substrate has a plurality of repeats of the texture pattern;

an overprint printed onto the carpet substrate, wherein the overprint comprises a plurality of adjacent design elements and wherein at least a first one of the plurality of design elements of the overprint shares a boundary with at least one adjacent design element of the overprint and wherein the design elements of the overprint are, at least along the two opposite edges of the carpet component, arranged so that a design of the first design element of the overprint is predictable from a design of the adjacent design element of the overprint, and wherein the relationship between the texture pattern of the carpet substrate and the overprint is not in register, and wherein the overprint of adjacent carpet components are in alignment along at least some of the abutting portions of the carpet components.

9. The floor covering of claim 8, wherein the carpet substrate comprises a plurality of different yarn types.

10. The floor covering of claim 9, wherein the plurality of different yarn types comprises a sulfonated cationic dyeable fiber and a non-sulfonated cationic dyeable fiber.

11. The floor covering of claim 8, wherein the texture pattern comprises a plurality of blocks of substantially the same size randomly arranged wherein each of the blocks defines a predictable pattern.

12. The floor covering of claim 8, wherein the texture pattern comprises the pattern repeated in a linear direction within the carpet substrate.

13. The floor covering of claim 12, wherein the overprint has a repeating design size and the texture pattern has a repeating pattern size and wherein the repeating design size is different from the repeating pattern size.

14. A method for creating a carpet component comprising the steps of:

tufting yarn into a primary backing and creating a carpet substrate having a texture defined by a plurality of repeats of a texture pattern comprising an unpredictable combination of a plurality of adjacent design elements formed by one or more of: (a) forming loops in the carpet substrate of different heights, (b) forming a pile surface of different heights, or (c) selectively cutting at least some tufts in the carpet component, or (d) creating a carpet substrate using a plurality of yarn types, and overprinting a design onto the carpet substrate to form the carpet component, wherein the overprint comprises a predictable combination of printed design elements, and wherein the overprinted design and the texture pattern of the carpet substrate are not in register.

15. The method of claim 14, further comprising:

dividing a design having a predictable arrangement of design elements into a plurality of blocks having substantially similar shapes; and rearranging the blocks in an unpredictable manner to create the pattern wherein at least some of the design elements are discontinuous at a boundary between individual blocks.

16. The method of claim 15, wherein rearranging the blocks includes varying the orientation of individual blocks.

17. The method of claim 14, further comprising:

dividing a design having a predictable arrangement of design elements into a plurality of blocks having substantially similar shapes; and arranging at least some of the blocks in an unpredictable manner to create the pattern.

18. The method of claim 14, wherein at least a first one of the unpredictable combination of the plurality of design elements of the texture pattern shares a boundary with at least one adjacent design element of the texture pattern and wherein the unpredictable combination of the plurality of design elements of the texture pattern intersect at least two opposite edges of the carpet component and are arranged so that a design of the first design element of the texture pattern is not predictable from a design of the at least one adjacent design element of the texture pattern.

* * * * *